United States Patent
Yun et al.

(10) Patent No.: US 10,313,508 B2
(45) Date of Patent: Jun. 4, 2019

(54) NON-INTRUSIVE USER AUTHENTICATION SYSTEM

(71) Applicant: Google LLC, Mountain View, CA (US)

(72) Inventors: Yipeng Yun, Sunnyvale, CA (US); Kaiwen Gu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/042,779

(22) Filed: Jul. 23, 2018

(65) Prior Publication Data
US 2019/0007549 A1 Jan. 3, 2019

Related U.S. Application Data

(63) Continuation of application No. 15/389,824, filed on Dec. 23, 2016, now Pat. No. 10,051,112.

(51) Int. Cl.
*H04M 1/66* (2006.01)
*H04M 1/725* (2006.01)
(Continued)

(52) U.S. Cl.
CPC .... *H04M 1/72577* (2013.01); *G06K 9/00355* (2013.01); *G06K 9/00892* (2013.01); *H04W 12/06* (2013.01)

(58) Field of Classification Search
CPC ..... H04W 12/02; H04W 12/06; H04W 12/08; H04W 12/12; H04W 88/02; H04M 1/72519; H04M 1/274566; H04M 1/72522; H04M 1/2745; H04M 1/274575; H04M 1/274558; H04M 1/0214; H04M 2250/12
(Continued)

(56) References Cited

U.S. PATENT DOCUMENTS

2010/0225443 A1 9/2010 Bayram et al.
2012/0246079 A1 9/2012 Wilson et al.
(Continued)

FOREIGN PATENT DOCUMENTS

WO 2011/057287 A1 5/2011

OTHER PUBLICATIONS

International Search Report and Written Opinion dated Nov. 24, 2017 in Application PCT/US2017/052193.
(Continued)

*Primary Examiner* — Temica M Beamer
(74) *Attorney, Agent, or Firm* — Lerner, David, Littenberg, Krumholz & Mentlik, LLP (57) ABSTRACT

A system for secure user authentication of a mobile electronic device includes a touch-based user interface of the mobile electronic device, a processor, and a computer-readable storage medium. The system presents a graphical user interface comprising a target location represented by a graphical indication, and receives an authentication code comprising a sequence of taps. The system determines input positional data associated with the authentication code that indicates a location on the touch-based user interface where the sequence of taps is received. The system determines whether to permit a user of the mobile electronic device to access a function of the mobile electronic device based at least in part on whether the input positional data is consistent with previous input received from the user of the mobile electronic device.

17 Claims, 4 Drawing Sheets

(51) Int. Cl.
*H04W 12/06* (2009.01)
*G06K 9/00* (2006.01)

(58) Field of Classification Search
USPC ............... 455/410, 411, 565, 566, 550.1
See application file for complete search history.

(56) References Cited

U.S. PATENT DOCUMENTS

| | | | |
|---|---|---|---|
| 2012/0306758 A1 | 12/2012 | Marsden et al. | |
| 2013/0288647 A1* | 10/2013 | Turgeman | H04W 12/06 455/411 |
| 2015/0205379 A1* | 7/2015 | Mag | G06F 1/1626 345/156 |
| 2015/0257004 A1 | 9/2015 | Shanmugam et al. | |
| 2015/0347725 A1 | 12/2015 | Ben Ari et al. | |
| 2015/0373010 A1 | 12/2015 | Zhang et al. | |
| 2016/0048834 A1 | 2/2016 | Kurian | |
| 2016/0050209 A1 | 2/2016 | Govande et al. | |
| 2016/0234341 A1 | 8/2016 | Dare et al. | |
| 2016/0246472 A1 | 8/2016 | Zhao | |
| 2017/0371450 A1* | 12/2017 | Heller | G06F 3/044 |

OTHER PUBLICATIONS

Cheng, et al., "Continuous User Identification via Touch and Movement Behavioral Biometrics" 2014 IEEE International Performance Computing and Communications Conference, IEEE, Dec. 5, 2014, pp. 1-8.

Giuffrida, C et al., "I Sensed It Was You: Authenticating Mobile Users with Sensor-enhanced Keystroke Dynamics" Proceedings of the 11th International Conference 2014, available at http://www.syssec-project.eu/m/page-media/3/sense_dimva14.pdf.

Written Opinion for PCT Application No. PCT/US2017/052193, dated Nov. 14, 2018. 9 pages.

International Preliminary Report on Patentability for PCT Application No. PCT/US2017/052193 dated Feb. 8, 2019. 25 pages.

* cited by examiner

NON-INTRUSIVE USER AUTHENTICATION SYSTEM

CROSS-REFERENCE TO RELATED APPLICATIONS

The present application is a continuation of U.S. patent application Ser. No. 15/389,824, filed Dec. 23, 2016, the disclosure of which is incorporated herein by reference.

BACKGROUND

Current authentication techniques for mobile devices raise security concerns or can be costly to implement. For example, key code based authentication techniques are often vulnerable to overseers, and key codes can easily be memorized or ascertained by imposters. More secure authentication techniques, like biometric authentication, often requires the presence of additional sensors which increases the cost to manufacture the device. And while additional sensors may improve the security of the authentication process, they also require additional processing power which drains the device battery.

This document describes novel methods and systems for the secure authentication of a mobile electronic device user using motion and other sensors that are generally present in most mobile devices.

SUMMARY

A system for secure user authentication of a mobile electronic device includes a touch-based user interface of the mobile electronic device, a processor, and a computer-readable storage medium. The computer-readable storage medium includes one or more programming instructions that cause the processor to perform certain actions. The system presents, via the touch-based user interface, a graphical user interface comprising a target location represented by a graphical indication. The system receives, via the touch-based user interface, an authentication code comprising a sequence of taps. The system determines input positional data associated with the authentication code. The input positional data indicates a location on the touch-based user interface where the sequence of taps is received. The system determines whether to permit a user of the mobile electronic device to access a function of the mobile electronic device based at least in part on whether the input positional data is consistent with previous input received from the user of the mobile electronic device. In response to determining to permit the user to access the function of the mobile electronic device, the system permits the user to access the function of the mobile electronic device.

Optionally, for each tap in the sequence of taps, the system may detect a location on the touch-based user interface where the tap is received, and determine an offset representing a position of the location on the touch-based user interface where the tap is received relative to a location of the graphical indication.

Optionally, the system may determine whether the input positional data is consistent with a machine learning classifier associated with the user of the mobile electronic device. The system may update the machine learning classifier to reflect the input positional data.

The system may further include one or more motion sensors. The system may detect, by one or more of the motion sensors, first vibration data representing one or more vibrations experienced by the mobile electronic device that are associated with the sequence of taps. The system may determine to permit the user to access the function of the mobile electronic device in response to determining that the input positional data and the first vibration data is consistent with the machine learning classifier associated with the user.

The system may detect, by one or more of the motion sensors, second vibration data representing one or more vibrations experienced by the mobile electronic device that are not associated with the sequence of taps. The system may determine to permit the user to access the function of the mobile electronic device in response to determining that the input positional data, the first vibration data and the second vibration data is consistent with the machine learning classifier associated with the user.

Optionally, the system may include one or more motion sensors. The system may detect, by one or more of the motion sensors, rotational velocity associated with the mobile electronic device while the sequence of taps is being received by the touch-based user interface. The system may determine whether the rotational velocity is consistent with the machine learning classifier associated with the user. Optionally, the system may determine to permit the user to access the function of the mobile electronic device in response to determining that the input positional data and the rotational velocity is consistent with the machine learning classifier associated with the user.

A system for secure user authentication of a mobile electronic device includes a touch-based user interface of a mobile electronic device, an audio sensor of the mobile electronic device, a processor, and a computer-readable storage medium. The computer-readable storage medium includes one or more programming instructions that cause the processor to perform certain actions. The system presents, via the touch-based user interface, a graphical user interface comprising a target location represented by a graphical indication. The system receives, via the touch-based user interface, an authentication code comprising a sequence of taps. As the sequence of taps is being received by the touch-based user interface, the system determines input positional data associated with the authentication code. The input positional data indicates a location on the touch-based user interface where the sequence of taps is received. The system detects, by the audio sensor, audio data that occurs in proximity to the mobile electronic device. The system determines whether to permit a user of the mobile electronic device to access a function of the mobile electronic device based at least in part on whether the input positional data and the audio data is consistent with previous input received from the user of the mobile electronic device. In response to determining to permit the user to access the function of the mobile electronic device, the system permits the user to access the function of the mobile electronic device.

Optionally, the system may, for each tap in the sequence of taps, detect a location on the touch-based user interface where the tap is received, and determine an offset representing a position of the location on the touch-based user interface where the tap is received relative to a location of the graphical indication.

The system may determine whether the input positional data and the audio data is consistent with a machine learning classifier associated with the user of the mobile electronic device. The system may determine whether the input positional data and the audio data are consistent with a machine learning classifier by extracting, from the audio data, entry audio data that is associated with an amplitude that exceeds a threshold value, and determining whether the entry audio data that is extracted is consistent with the machine learning classifier associated with the user. The system may update the machine learning classifier to reflect the input positional data and the audio data.

DETAILED DESCRIPTION

Terminology that is relevant to this disclosure includes:

In this document, the singular forms "a," "an," and "the" include plural references unless the context clearly dictates otherwise. The term "comprising" means "including, but not limited to." Similarly, the term "comprises" means "includes, and is not limited to."

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, wearables such as, for example, smartwatches, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements of electronic devices will be discussed below in the context of FIG. 5.

In this document, the terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

In this document, the terms "memory," "memory device," "data store," "data storage facility," "computer-readable storage medium" and the like each refer to a non-transitory device on which computer-readable data, programming instructions or both are stored. Except where specifically stated otherwise, the terms "memory," "memory device," "data store," "data storage facility," "computer-readable storage medium" and the like are intended to include single device embodiments, embodiments in which multiple memory devices together or collectively store a set of data or instructions, as well as individual sectors within such devices.

"Motion sensor" refers to a device that measures one or more components of motion of an electronic device.

"Movement information" refers to measurements associated with the movement of an electronic device. Examples of movement information include, without limitation, vibrations, acceleration, velocity, angular velocity, rotational velocity, momentum, and rotation experienced by an electronic device.

A "touch-based user interface" refers to a touch-sensitive user interface or a user interface that can determine touch positions of the user interface.

"Vibration" refers to movement or mechanical oscillation about an equilibrium position of an electronic device.

Unless defined otherwise, all technical and scientific terms used in this document have the same meanings as commonly understood by one of ordinary skill in the art.

Figure 1:
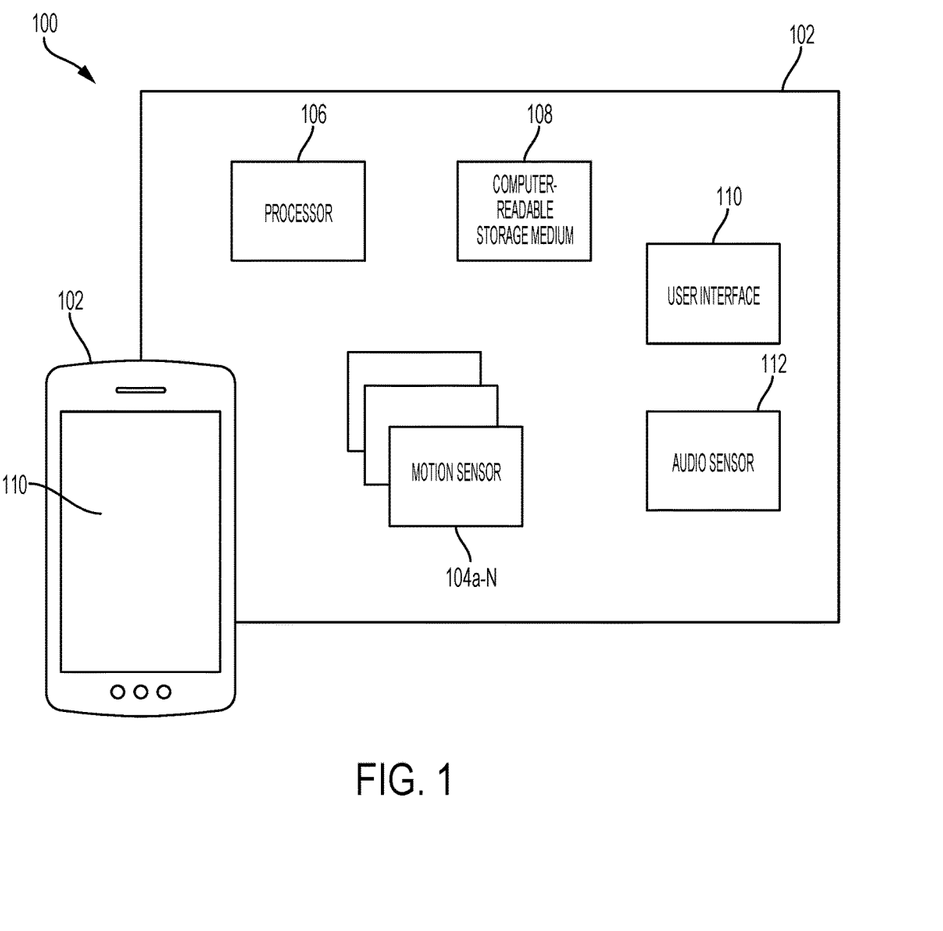
FIG. 1 illustrates an example system for secure user authentication of a mobile electronic device according to an embodiment.

FIG. 1 illustrates an example system for secure user authentication of a mobile electronic device according to an embodiment. As illustrated by FIG. 1, the system 100 includes an electronic device 102, such as a mobile electronic device. The electronic device includes one or more motion sensors 104a-N. A motion sensor 104a-N refers to a device that measures one or more components of motion of an electronic device. An example motion sensor 104a-N may be, without limitation, an accelerometer, a gyroscope, a combination inertial measurement unit (IMU) and/or the like.

As illustrated in FIG. 1, the electronic device 102 includes a processor 106 and a non-transitory computer-readable storage medium 108. The non-transitory computer-readable storage medium 108 includes one or more programming instructions that cause the processor to perform certain actions as explained in more detail below. The electronic device 102 includes a user interface 110. The user interface 110 may be a touch-based user interface. An example of a touch-based user interface may be a touch-sensitive interface. Another example of a touch-based user interface may be a user interface that is not touch-sensitive, but can determine touch positions of the user interface. For instance, a user interface that includes positional sensors located around a perimeter of the user interface. As shown in FIG. 1, the electronic device 102 includes an audio sensor 112, such as, for example, a microphone.

Figure 2:
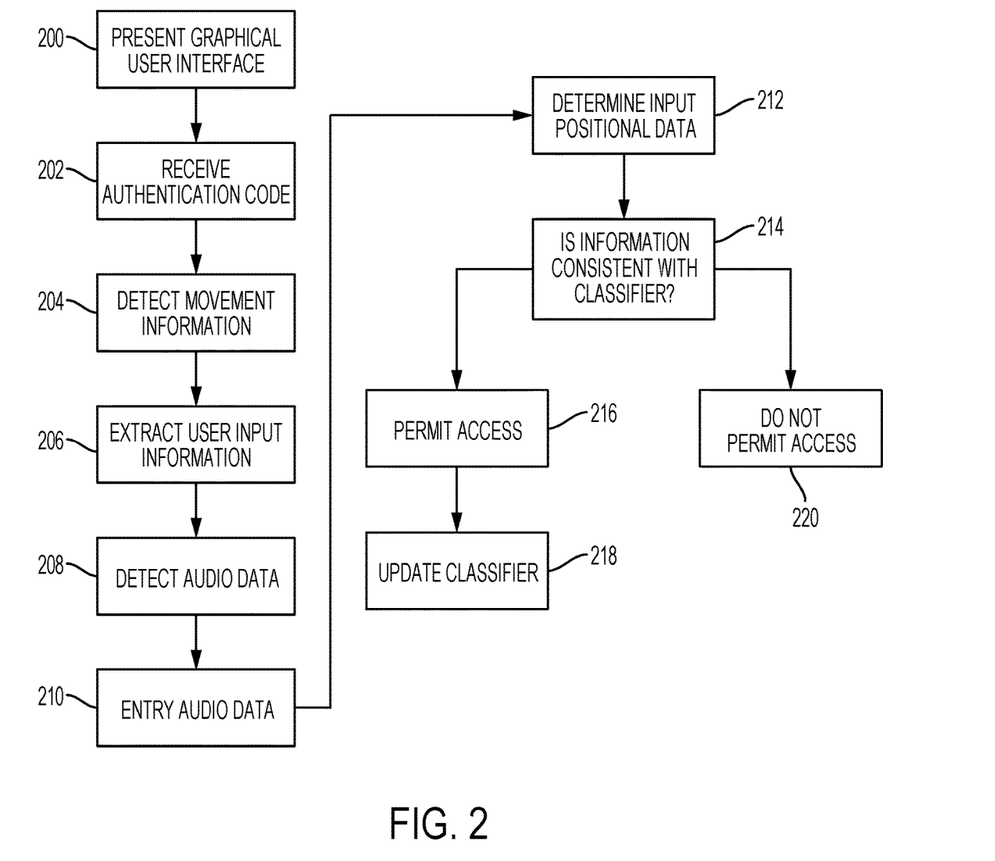
FIG. 2 illustrates an example method of securely authenticating a user of a mobile electronic device according to an embodiment.

The authentication processes described in this document (or one or more portions of the processes), such as, for example, with respect to FIG. 2, may be used to protect a user against unauthorized access to an electronic device by known or unknown persons. For example, the described authentication processes may protect against an unauthorized user accessing an electronic device that has been lost or stolen. As another example, an electronic device may support multi-user profiles. The described authentication processes may protect against a known user of an electronic device accessing a profile that the known user does not have authorization to access. For instance, User A and User B each may have a profile set up on an electronic device. The authentication processes described in this document may protect against User A accessing User B's profile and vice versa.

FIG. 2 illustrates an example method of securely authenticating a user of a mobile electronic device according to an embodiment. As illustrated in FIG. 2, a mobile electronic device presents 200 a graphical user interface to a user. The mobile electronic device may present a graphical user interface to a user via a user interface, such as a touch-based user interface, of the mobile electronic device. The mobile electronic device presents the graphical user interface to a user as part of a user authentication process for the mobile electronic device. For instance, a mobile electronic device may present a graphical user interface to a user as part of the user logging into the mobile electronic device, registering with the mobile electronic device, booting up the mobile electronic device and/or the like.

The mobile electronic device may present the graphical user interface to a user in response to receiving an indication that the user desires to access the mobile electronic device. For instance, a mobile electronic device may receive input from a user of the mobile electronic device that the user desires to access information or functionality of the mobile electronic device. The input may include, without limitation, touch input via the user interface, input in the form of the pressing of one or more buttons, switches and/or the like of the mobile electronic device, receipt of a voice command from a microphone or speaker of the mobile electronic device, and/or the like.

The graphical user interface that is displayed may include a graphical indication. A graphical indication refers to a symbol or other marker that represents a target location on the user interface. A target location refers to a location or position on a user interface where a mobile electronic device user is to input an authentication code. Example graphical indications may include, without limitation, a cross symbol, an 'x' symbol, a circle, a square or other shape, or other symbol.

Figure 3:
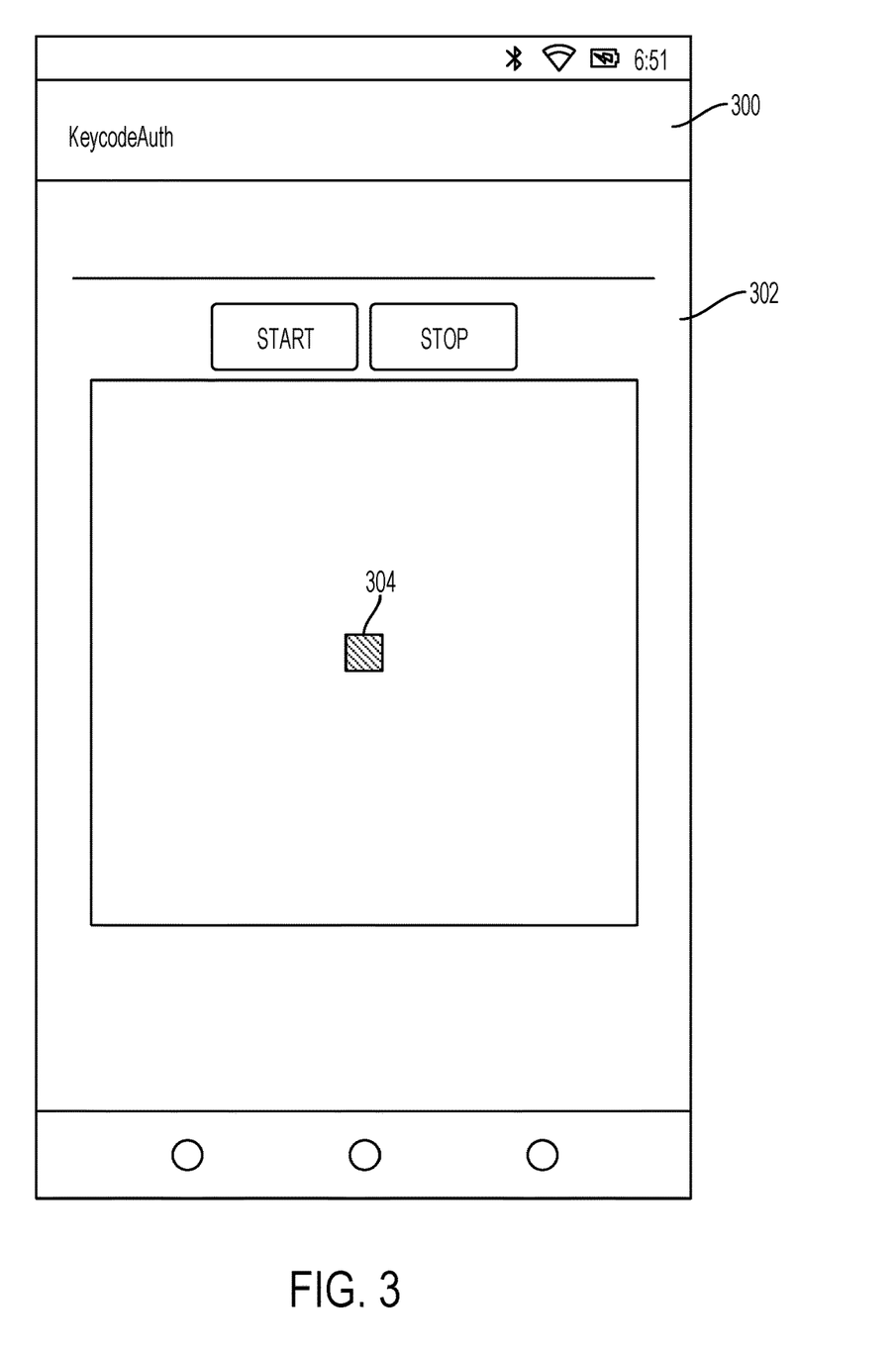
FIG. 3 illustrates an example graphical indication that may be displayed to a mobile electronic device user according to an embodiment.

FIG. 3 illustrates an example graphical indication that may be displayed to a mobile electronic device user according to an embodiment. As shown in FIG. 3, a user interface of a mobile electronic device 300 displays a graphical user interface 302 that includes a graphical indication 304. The graphical indication 304 is a square positioned at a certain location on the user interface. In some embodiments, the graphical indication may be displayed at the same position on the user interface during each user authentication. In other embodiments, the graphical indication may be displayed at different positions on the user interface during user authentications. For instance, a mobile electronic device may cause a graphical indication to be displayed at a random location on the user interface.

In an embodiment, a mobile electronic device may not present a graphical user interface to a user as part of an authentication process. For instance, a mobile electronic device may be in an inactive mode. A user may begin the authentication process with step 202 described below.

Referring back to FIG. 2, the mobile electronic device may receive 202 an authentication code from a user. An authentication code refers to input or a sequence of input that is specific to the mobile electronic device user that is used to verify the identity of the user. For instance, an authentication code may be a password, a personal identification number (PIN), or a biometric input such as a retinal scan, a fingerprint scan and/or the like. An authentication code may be a sequence or pattern of inputs, such as taps that are input on a touch-based user interface. A sequence or pattern of taps may be specific to a particular user in the number of taps in the sequence and/or the duration of the taps in the sequence. For instance, a mobile electronic device user may create an authentication code that the mobile electronic device user must provide to gain access to the mobile electronic device. That authentication code may be a sequence of five taps having the following duration: long, short, short, long, short. Additional and/or alternate authentication codes may be used within the scope of this disclosure.

In various embodiments, one or more motion sensors of the mobile electronic device may detect 204 movement information associated with the mobile electronic device. Movement information refers to measurements associated with the movement of an electronic device. Examples of movement information include, without limitation, vibrations, acceleration, velocity, momentum, and/or rotation experienced by an electronic device.

Movement information may be associated with the process of inputting an authentication code. For instance, the tapping involved in entering an authentication code via a touch-based user interface generates vibrations that are detected by a motion sensor such as an accelerometer. Movement information may be associated with movement of an electronic device that is not attributable to entry of an authentication code. For instance, a user may move an electronic device side to side or may turn an electronic device which generates movement information that is not a result of tapping an authentication code.

The motion sensors may detect 204 movement information during a time period that encompasses when an authentication code is received by the mobile electronic device. For instance, motion sensors may detect 204 movement information during a time period that begins when a graphical user interface is presented 200 to a user and ends 100 ms after the last tap is detected. Additional and/or alternate time periods may be used within the scope of this disclosure.

Alternatively, motion sensors may detect 204 and record movement information associated with a mobile electronic device at certain times. The mobile electronic device may identify movement information associated with a relevant time period as part of the authentication process. For instance, a mobile electronic device may only analyze movement information that was collected during a time period that begins when a graphical user interface is presented 200 to a user and ends 100 ms after the last set of high-amplitude vibration data is detected. As another, example, a mobile electronic device may analyze movement information that was collected during any period of movement of the mobile electronic device such as, for example, prior to an authentication code being provided. For instance, in response to detecting movement, a mobile electronic device may begin recording corresponding movement information. This movement may be a user removing the mobile electronic device from a pocket or bag to use the device. The mobile electronic device may stop recording movement information a certain period of time after such movement ceases. In various embodiments, movement information may include timestamps associated with one or more measurements. For instance, a mobile electronic device can include a clock that assigns a timestamp to data detected by a motion sensor.

As discussed above, a motion sensor may include an accelerometer, a gyroscope or an IMU device that includes one or more accelerometers and/or gyroscopes. An accelerometer is a sensor that measures the dynamic acceleration of an electronic device on one, two or three axes. An accelerometer can be used to sense vibrations experienced by the mobile electronic device. An electronic device can include accelerometers that detect certain types of vibrations. For instance, one accelerometer may be used to detect vibrations having a certain amplitude or range of amplitude values, while another accelerometer may be used to detect vibrations having a different amplitude or a different range of amplitude values.

A gyroscope is a sensor that detects rotational motion of an electronic device. As such, a gyroscope can be used to detect an orientation of an electronic device. A gyroscope detects rotational motion on one, two or three axes.

Referring back to FIG. 2, a mobile electronic device extracts 206 certain movement information from the received movement information. A mobile electronic device may extract movement information based on an amplitude associated with such information. For example, vibrations associated with the input of an authentication code generally have high amplitudes as compared to vibrations caused by other sources, such as rotating or moving the mobile electronic device. A mobile electronic device may extract 206 movement information associated with amplitude values that exceed a certain threshold value or within a certain value range, as this movement information may be attributable to the input of an authentication code by a mobile electronic device. This extracted movement information is referred to in this disclosure as "user input information."

A mobile electronic device may extract 206 movement information from the detected movement information that is not attributable to entry of the authentication code. This extracted information is referred to as "noise" throughout this document.

Mobile electronic device users tend to hold their mobile electronic devices in a specific and consistent manner when inputting their authentication codes. For example, a first mobile electronic device user may hold his mobile electronic device with both hands while entering his authentication code with his thumbs. A second mobile electronic device user may hold her mobile electronic device with one hand while entering her authentication code with her pointer finger on the opposite hand. Both techniques generate noise that is specific to the manner in which the mobile electronic device is being handled. However, the noise will differ between the two techniques.

In various embodiments, vibrations associated with noise generally have low amplitude as compared to vibrations associated with entry of an authentication code. As such, a mobile electronic device may extract 206 noise from the received movement information by extracting movement information having an amplitude value that is less than a threshold value, or within a certain value range.

Referring back to FIG. 2, in addition to detecting movement information, a mobile electronic device may detect 208 audio data in proximity to the mobile electronic device. Audio data refers to one or more sounds in a surrounding area of a mobile electronic device over a period of time. Audio data may include one or more timestamps associated with the audio data. For instance, a mobile electronic device can include a clock that assigns a timestamp to audio data detected by an audio sensor.

An audio sensor of a mobile electronic device can detect and capture audio data. An example of an audio sensor may be a microphone. A mobile electronic device may request approval from a user before it activates or enables use of an audio sensor. For instance, a user may be required to press a button or touch a user interface element to confirm that an audio sensor can be activated. If the user confirms that an audio sensor can be activated, the mobile electronic device activates the audio sensor and detects audio data. If the user does not confirm that an audio sensor can be activated (or specifies that the audio sensor is not to be activated), the mobile electronic device will not activate the audio sensor, and the mobile electronic device will not detect or analyze audio data for that authentication session.

If a user confirms that an audio sensor can be activated, a mobile electronic device activates the audio sensor and begins to detect audio data. A mobile electronic device can detect audio data for a certain period of time. For instance, an audio sensor may begin detecting audio data when a graphical user interface is presented to a user, and may stop detecting audio data five seconds afterwards as a user typically enters an authentication code within three seconds. Additional and/or alternate time periods may be used within the scope of this disclosure. Alternatively, a microphone may detect audio data until a user indicates that the audio sensor is to be deactivated.

A mobile electronic device can extract 210 entry audio data from the detected audio data. Entry audio data refers to audio data that is associated with entry of the authentication code. When a user enters an authentication code on a mobile electronic device, it generates sound that can be captured by an audio sensor of the mobile electronic device. For instance, depressing keys on a keyboard generates sound. Likewise, tapping on a touch-based user interface also generates sound. The sound associated with entry of an authentication code is generally high-amplitude sound. As such, a mobile electronic device can extract entry audio data by identifying high-amplitude audio data from the detected audio data. A mobile electronic device may extract, as entry audio data, audio data associated with amplitude values that exceed a certain threshold value or that are within a certain value range.

A mobile electronic device determines 212 input positional data associated with entry of an authentication code. Input positional data refers to a location on the user interface where the authentication code is received relative to the position of the graphical indication. Mobile electronic device users tend to enter input at a location on a user interface that is consistently relative to a graphical indication. For instance, if the graphical indication is an 'x', a mobile electronic device user will tend to enter his or her authentication code in the same location again and again relative to the 'x' (e.g., near the top right corner of the 'x', near the top left corner of the 'x', etc.).

A mobile electronic device determines an input position on a user interface where user input, such as a tap, is received. A mobile electronic device may determine an input position for each input, such as, for example, each tap. This input position may be represented by one or more coordinates. The mobile electronic device determines an offset between the input position and a particular location associated with the graphical indication. For example, an offset may represent a distance between a center of an input position and a center of a graphical indication. As such, an offset may represent a position relative to a graphical indication where a user has entered input.

A mobile electronic device may maintain a machine learning classifier associated with a user of the mobile electronic device. A machine learning classifier may represent a collection of data that is observed based on a mobile electronic device user's interaction with a mobile electronic device over a period of time. The collection of data may include user input information pertaining to an authentication code for the user, such as the sequence and duration of taps. The collection of data may include data pertaining to noise and/or entry audio data that is experienced when the user provides the authentication code. The collection of data may include input positional data that is indicative of a location relative to a graphical indication where the user provides an authentication code on a user interface.

In various embodiments, a classifier may be seeded with data obtained from one or more initial user interactions with the mobile electronic device such as, for instance, an authentication code as originally input by the user, the noise level associated with this initial interaction, entry audio data that is detected during this initial interaction, and the positional data associated with where on the display the user enters his authentication code. Over time, the classifier may be trained through usage to more accurately reflect the user's tendencies. For example, if a mobile electronic device authenticates a user, it may update the machine learning classifier for the user to reflect the detected vibration data and input positional data for that authentication.

Referring back to FIG. 2, a mobile electronic device determines whether to permit a user to access a mobile electronic device or a function of the mobile electronic device. A mobile electronic device may make this determination by determining 214 whether the user input information, noise, entry audio data and/or input positional data is consistent with previous input received from the user of the mobile electronic device. Previous input may refer to user input information, noise, entry audio data, input positional data or other input that a user of a mobile device has provided in the past, such as, for example, over a past period of time. For instance, a mobile electronic device may determine 214 whether the user input information, noise, entry audio data and/or input positional data is consistent with a machine learning classifier for the user. Any combination or subset of such information may be used. A mobile electronic device may determine whether the user input information is consistent with the user's authentication code. This entails comparing the sequence and duration of the input as represented by the user input information with the machine learning classifier. For instance, the mobile electronic device may compare timestamps associated with received user input information and that of a classifier to determine whether one or more durations of input received (e.g., a duration of a tap) and one or more durations of time between input that is received (e.g., time between taps) is consistent.

The mobile electronic device may determine whether the received noise is consistent with noise of the classifier. As discussed above, noise may indicate a manner in which a mobile electronic device was held or handled. The comparison may indicate whether the manner in which a mobile electronic device was handled is consistent with how the user has held his or her electronic device during past input entries.

The mobile electronic device may determine whether the entry audio data is consistent with the entry audio data associated with the classifier. For instance, the mobile electronic device may compare the amplitudes of the detected entry audio data with the amplitudes of the entry audio data of the classifier to determine whether the amplitudes are consistent. The mobile electronic device may compare timestamps of the entry audio data with timestamps of the entry audio data to determine whether the high-amplitude data was detected at consistent times and whether the entry audio data was detected at consistent times relative to the data points of the entry audio data. For example, a mobile electronic device may determine that entry audio data includes four high-amplitude data points that are spaced approximately 100 ms apart. The mobile electronic device may determine whether the number of high-amplitude data points and their spacing is consistent with entry audio information of the classifier.

The mobile electronic device may determine whether received input positional data is consistent with input positional data of the classifier. For instance, the mobile electronic device may determine whether the offset of the input positional data is consistent with the offset indicated by the classifier. This comparison may indicate if the position of where the authentication code was input relative to the graphical indication is consistent with past entries.

In response to determining that the user input information, the noise and/or the input positional data is consistent with that of the machine learning classifier of the user, the mobile electronic device may permit 216 the user to access the mobile electronic device or a function of the mobile electronic device.

The mobile electronic device may update 218 the classifier for the user to reflect the received user input information, noise and/or the input positional data. In this way, the machine learning classifier is further trained to reflect the authentication code entry characteristics of the user.

In response to determining that the user input information, noise and/or the input positional data is not consistent with the machine learning classifier of the user, the mobile electronic device may not permit 220 the user to access the mobile electronic device or a function of the mobile electronic device. The mobile electronic device may prompt the user to re-enter his or her authentication code, or the mobile electronic device may prompt the user to take another action, such as answering one or more security questions, contact an administrator, or perform another authentication action.

In various embodiments, the authentication processes described in this document (or one or more portions of the processes), such as, for example, with respect to FIG. 2, may be implemented as standalone authentication processes. In other embodiments, at least a portion of the authentication processes described in this document may be implemented as an underlying layer to one or more other authentication methods. In certain embodiments, the user may not know that the additional layer of authentication is being performed, therefore providing a more secure but less intrusive authentication process for the user.

For example, a mobile electronic device may require a user to enter a keycode, such as a personal identification number or pattern code, via an unlock touch-based user interface to access the mobile electronic device. The unlock touch-based user interface may include a graphical representation of each possible entry, such as for example, each possible number. The mobile electronic device authenticate a user not only based on whether or not the correct keycode is presented, but also whether other information, such as user input information, noise, entry audio data and/or input positional data, is consistent with a classifier for the user.

For example, a mobile electronic device may determine input positional data associated with entry of a keycode. The mobile electronic device may determine an input position on a user interface where entry of the keycode (or a portion of the keycode, such as a number) is received. A mobile electronic device may determine an input position for each input, such as, for example, each number of the keycode. For instance, if a user selects the graphical representation of '3' on the unlock touch-based user interface, the mobile electronic device may determine an input position on this input. The input position may be represented by one or more coordinates.

The mobile electronic device determines an offset between the input position and a particular location associated with the graphical representation of the input the user selected. For example, an offset may represent a distance between a center of an input position and a center of a graphical representation of. As such, an offset may represent a position relative to a graphical representation where a user has entered input. For instance, in the above example, the mobile electronic device may determine an offset between a center of the graphical representation '3' and a center of the input position.

Figure 4:
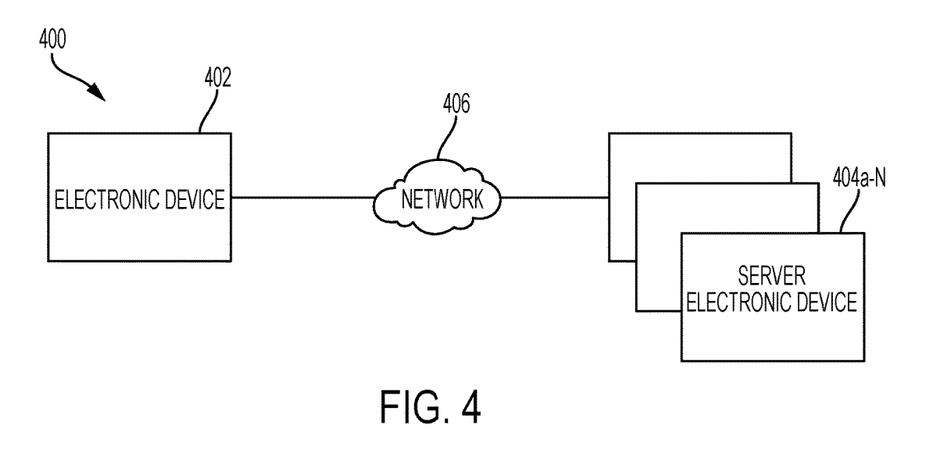
FIG. 4 illustrates an example distributed computing system according to an embodiment.

The authentication process described by this disclosure is described throughout the disclosure as being performed by a mobile electronic device. This provides certain advantages including quicker processing times and a lower susceptibility to hacking, intrusion or unauthorized access to a user's authentication code or other credentials. However, the authentication process described in this disclosure can be performed across a distributed computing system. FIG. 4 illustrates an example distributed computing system for secure user authentication of a mobile electronic device according to an embodiment.

As illustrated by FIG. 4, the distributed computing system 400 includes an electronic device 402, such as the electronic device described above in FIG. 1. The system 400 includes one or more server electronic devices 404a-N that communicate with the electronic device 402 via a communication network 406. A communication network 406 may be a local area network (LAN), a wide area network (WAN), a mobile or cellular communication network, an extranet, an intranet, the Internet and/or the like. One or more steps of the described authentication process, such as the process illustrated by FIG. 2, may be performed by the electronic device 402, one or more of the server electronic devices 404a-N or a combination of the electronic device and one or more server electronic devices.

Figure 5:
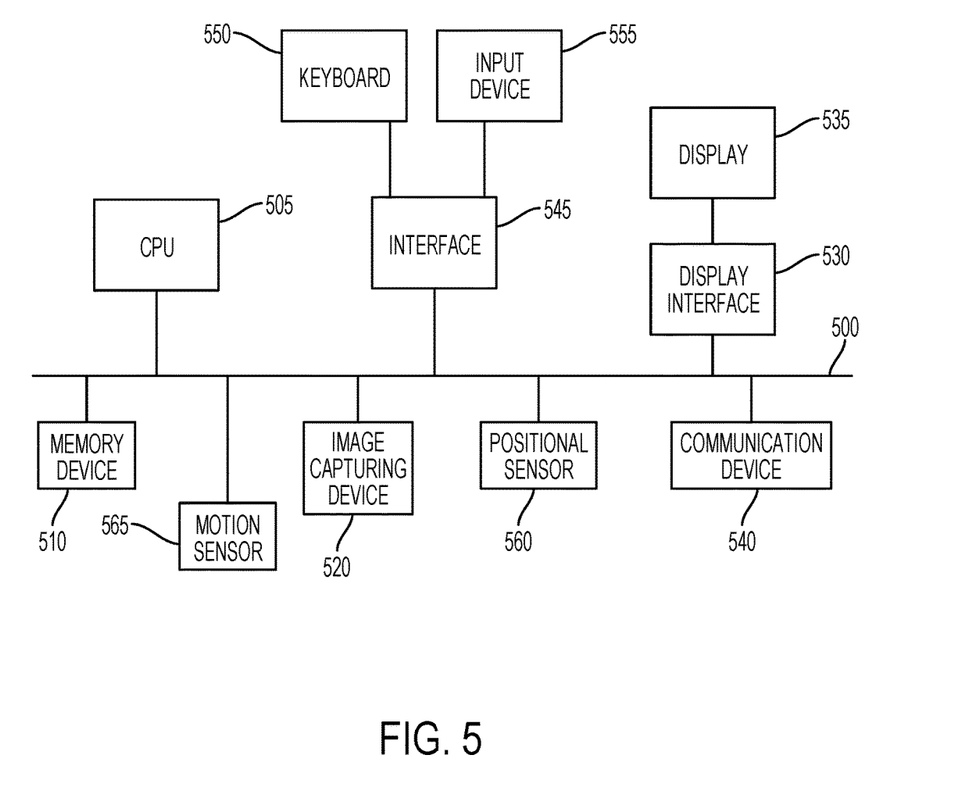
FIG. 5 depicts a block diagram of hardware that may be used to contain or implement program instructions

FIG. 5 depicts a block diagram of hardware that may be used to contain or implement program instructions, such as those of a cloud-based server, electronic device, virtual machine, or container. A bus 500 serves as an information highway interconnecting the other illustrated components of the hardware. The bus may be a physical connection between elements of the system, or a wired or wireless communication system via which various elements of the system share data. Processor 505 is a processing device of the, performing calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 510 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 535 in audio, visual, graphic or alphanumeric format. Communication with external devices, such as a printing device, may occur using various communication devices 540, such as a communication port or antenna. A communication device 540 may be communicatively connected to a communication network, such as the Internet or an intranet.

The hardware may also include a user input interface 545 which allows for receipt of data from input devices such as a keyboard or keypad 550, or other input device 555 such as a mouse, a touch pad, a touch screen, a remote control, a pointing device, a video input device and/or a microphone. Data also may be received from an image capturing device 520 such as a digital camera or video camera. A positional sensor 560 and/or motion sensor 550 may be included to detect position and movement of the device. Examples of motion sensors 550 include gyroscopes or accelerometers. Examples of positional sensors 560 include sensors such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for performing secure user authentication of a mobile electronic device, comprising:
    maintaining a machine learning classifier associated with an authorized user of the mobile electronic device, the machine learning classifier representing data observed based on authorized user movement information relating to the authorized user's interactions with the mobile device;
    presenting a graphical user interface;
    receiving, via the graphical user interface, an attempted authorization code comprising a sequence of taps,
    detecting, with one or more processors, movement information associated with the mobile electronic device during receipt of the attempted authorization code;
    extracting noise from the detected movement information, wherein the noise is associated with how the user holds the mobile electronic device while entering the attempted authorization code;
    comparing, with the one or more processors, the detected movement information with the machine learning classifier, wherein comparing the detected movement information with the machine learning classifier comprises comparing the extracted noise with an accepted noise associated with the authorized user movement information;
    determining, by the one or more processors, whether to permit access to the mobile electronic device based on whether the detected movement information is consistent with the authorized user movement information.

2. The method of claim 1, wherein extracting noise comprises extracting movement information having an amplitude value that is less than a threshold value.

3. The method of claim 1, wherein the movement information comprises measurements associated with the movement of an electronic device.

4. The method of claim 3, wherein detecting the movement information comprises detecting vibrations by a motion sensor.

5. The method of claim 3, wherein the movement information comprises timestamps associated with one or more of the measurements.

6. The method of claim 1, wherein the sequence of taps comprises a sequence of long and short taps, and further comprising:
    identifying a number of taps in the sequence; and
    detecting a duration of each tap in the sequence.

7. The method of claim 1, wherein detecting movement information associated with the mobile electronic device during receipt of the attempted authorization code comprises identifying a time when a graphical user interface is presented and identifying a time when a last tap is detected.

8. A system for performing secure user authentication of a mobile electronic device, comprising:
- a touch-based user interface of the mobile electronic device;
- a memory storing a machine learning classifier associated with an authorized user of the mobile electronic device, the machine learning classifier representing data observed based on authorized user movement information associated with an accepted authentication code by an authorized user; and
- a processor in communication with the memory, the processor configured to:
  - receiving, via the touch-based user interface, an attempted authorization code comprising a sequence of taps,
  - detect movement information associated with the mobile electronic device during receipt of the attempted authorization code;
  - extract noise from the detected movement information, wherein the noise is associated with how the user holds the mobile electronic device while entering the attempted authorization code;
  - compare the detected movement information with the machine learning classifier, the comparing comprising comparing the extracted noise with an accepted noise associated with the authorized user movement information; and
  - determine whether to permit access to the mobile electronic device based on whether the detected movement information is consistent with the authorized user movement information.

9. The system of claim 8, wherein in extracting noise the processors is further configured to extract movement information having an amplitude value that is less than a threshold value.

10. The system of claim 8, wherein the noise is detected movement information that is not attributable to entry of the attempted authorization code.

11. The system of claim 8, wherein the movement information comprises measurements associated with the movement of an electronic device.

12. The system of claim 11, further comprising a motion sensor configured to detect vibrations, wherein the detected movement information comprises the detected vibrations.

13. The system of claim 11, wherein the movement information further comprises timestamps associated with one or more of the measurements.

14. The system of claim 8, wherein:
- the sequence of taps comprises a sequence of long and short taps; and
- the processor is further configured to:
  - identify a number of taps in the sequence; and
  - detect a duration of each tap in the sequence.

15. The system of claim 8, further comprising one or more motion sensors configured to detect the movement information.

16. The method of claim 1, further comprising updating the machine learning classifier to reflect the extracted noise from the detected movement.

17. The system of claim 8, wherein the processor is further configured to:
- update the machine learning classifier to reflect the extracted noise from the detected movement.

* * * * *